United States Patent [19]

Mouri

[11] Patent Number: 5,015,026
[45] Date of Patent: May 14, 1991

[54] AUTOMOBILE SEAT HINGE

[75] Inventor: Takayuki Mouri, Kanagawa, Japan

[73] Assignee: Ikeda Bussan Co., Ltd., Ayase, Japan

[21] Appl. No.: 381,371

[22] Filed: Jul. 18, 1989

[30] Foreign Application Priority Data

Jul. 21, 1988 [JP] Japan .............................. 63-96485[U]

[51] Int. Cl.⁵ .............................................. B60N 2/20
[52] U.S. Cl. ..................................... 296/65.1; 296/66; 297/378
[58] Field of Search ................. 296/65.1, 66; 297/378, 297/379

[56] References Cited

U.S. PATENT DOCUMENTS 4,394,047 7/1983 Brunelle .......................... 297/378 X
4,475,763 10/1984 Hamatani et al. ............... 297/378 X

FOREIGN PATENT DOCUMENTS 167526 12/1981 Japan ................................... 297/378
57-22768 5/1982 Japan .
832108 4/1960 United Kingdom .................. 296/66

Primary Examiner—Margaret A. Focarino
Assistant Examiner—Gary C. Hoge
Attorney, Agent, or Firm—Foley & Lardner

[57] ABSTRACT

A rear seat cushion for the seat of an automobile is movable from a riding position to an escaped position. A seat back for the seat can be tilted forward from its normal standing position to a stacked position in which it lays over the seat cushion or, when the seat cushion is in the escaped position, to a "sunken" position in which it occupies the same space on the floor of the automobile that the seat cushion occupies in the riding position. A connector link of the hinge of the seat back has a unique arrangement of stops which allow the seat back to be maintained in each of its three positions without the need for the user to perform any locking operations. Also the seat back can be moved from one state to any of the others without any need for inconvenient unlocking operations of the hinge mechanism.

7 Claims, 3 Drawing Sheets

AUTOMOBILE SEAT HINGE

BACKGROUND OF THE INVENTION

1. Field of the Invention

The present invention relates to a vehicular seat hinge arrangement suitable for use in an automotive vehicle seat of the category of seat which includes a hinged seat cushion and a separately hinged seat back.

More specifically, the present invention relates to seat hinge arrangement suitable for use as, for example, the rear seat of an automotive vehicle and which is operable between a position in which it functions to accommodate a passenger of the automotive vehicle and an "escaped" position wherein the space within the vehicle normally occupied by the vehicular seat when it is in its riding position is made available for other purposes such as storage. Still more specifically the present invention seeks to provide a vehicular seat which is operable between its riding position, an intermediate "stacked" position, and its escaped position without any need on the part of the user for unlocking operations, and which can be maintained stably in any of the above riding, stacked, or escaped positions without the user having to carry out locking operations with respect to the hinge mechanism.

2. Description of the Prior Art

A known seat cushion arrangement invented prior to the present invention, is exemplified in JP-B2-57-22768.

In the above referenced publication, a car body connector hinge link, which is provided for anchoring a seat back cushion to the body of an automobile, has a pivot point defined at its lower portion. About this pivot point, the connector link is designed to pivot between a horizontal position and a vertical position.

At its upper side the bracket comprises a shaft by which it is pivotably connected, at a pivot point defined at the lower portion of the seat back, to the connector link. At its middle portion, the connector link comprises a bolt type stopper which is movable upwardly and downwardly.

When moved downwardly, the stopper cooperates with a groove defined in a portion of a cam member defined at the car body side of the connector link for maintaining the connector link in a predefined vertical position from which it may not fall forward.

By means of inserting the bolt type stopper into a groove or notch defined in a cam formed at the boss portion of the seat back, the seat back is restrained from falling forward relative to the connector link. In this way the seat back is, in effect, rigidly connected to the connector link which in turn pivots at the car body side of the bracket.

In the above disclosed arrangement, when the seat back is to be pivoted forward from it's standing position so as to occupy its "stacked" position, in which it lays over the lower seat cushion, the bolt or stopper must be removed from the groove defined in the cam member at the body side of the bracket in order to release the seat back mechanism after which the seat back may be pivoted forward.

When the seat back is to be pivoted forward so as to lie directly on the floor of the vehicle, and thus to occupy the space from which the seat cushion has been escaped, the stopper must be removed from the lower groove in order to allow the link to fall forward so that the seat back may lay directly on the floor of the vehicle.

It will be noted that in the above system problems exist that the stopper must be manipulated differently if the seat back is to be pivoted forward so as to rest on the seat cushion than if it is to be pivoted all the way forward so as to rest directly on the floor of the vehicle which is normally occupied by the seat cushion. This is troublesome and time consuming for the user. What is more, the construction of the above described connector link is rather complex, and therefore accordingly it is rather expensive to produce.

SUMMARY OF THE INVENTION

In view of the above problems in the known prior art devices, it is the object of the present invention to offer a simple and inexpensive seat back connector link system which may easily be operated between a standing position and a "sunken" state in which the seat back occupies the space on the floor of the vehicle from which the seat cushion has been removed, or a "stacked" position wherein it rests horizontally, directly above the seat cushion.

In order to achieve the above stated objects and others, a seat assembly according to the present invention comprises a seat cushion which is operable between a predetermined received or "riding" position wherein it rests on the floor of the vehicle, and an "escaped" position in which it stands vertically so as to leave the position on the floor of the vehicle vacant. A seat back is provided which is operable between a standing position, a stacked position in which it lays immediately above the top of the seat cushion in the riding position, and a "sunken" position wherein it directly occupies the space on the floor evacuated by the seat cushion when the seat cushion is disposed in the escaped position.

The seat back and seat cushion in cooperation define a vehicular seat.

A hinge mechanism is provided for connecting the seat back to the floor of the vehicle. The hinge mechanism comprises a body bracket by which it is connected to the vehicular body.

A connector link is also provided, this connector link is pivotally connected at its base end portion to the body bracket by means of a first pivot shaft so as to be pivotable thereabout between a forward laying position in which it lays forward horizontally, and a standing position in which it stands vertically. A seat back bracket is rigidly fixed to the lower portion of the seat back. The seat back bracket is pivotally connected to the connector link at the upper end portion thereof by means of a second pivot pin.

Either one of the vehicular body bracket or the connector link has a link stopper pin integrally formed on a side thereof. The link stopper pin is received in a first arcuate groove slot formed in the other one of the members (either the vehicular body bracket or the connector link). This first arcuate slot is concentric with the first pivot pin. The first arcuate slot has first stopper pin engaging portions defined therein for engaging the link stopper pin so as to restrict the movement of the connector link. The first stopper pin engaging portions restrict movement of the connector link so that it is pivotably movable between a predetermined forward tilted position beyond which the connector link may not sink in the forward direction, and a predetermined standing position beyond which the connector link may not tilt backwards.

One of the either the seat back bracket or the connector link has a second stopper pin integrally formed on a portion thereof. The second stopper pin is received in a second arcuate slot formed in either one of the vehicular seat back bracket or the connector link. The second arcuate slot has its center defined by the second pivot pin.

The second arcuate slot serves as the seat back stopper slot and has second stopper pin engaging portions defined therein. These second stopper portions engage the seat back stopper pin so as to restrict the range of movement of the seat back.

Thus, the seat back is restricted so as to be pivotably movable between a predetermined forward tilted position beyond which, by means of engagement of the second stopper pin and a first one of the seat back stopper pin engaging portions, it is restricted from tilting further forward, and a predetermined standing position beyond which the seat back is restricted, by means of engagement between the second stopper pin and a second stopper pin engaging portion of the second arcuate slot, from tilting further backwards.

When the connector link is in the forward tilted position, the lower side of the seat back is restricted from moving forward beyond the predetermined "sunken" position by the engagement between the first portion in first arcuate slot of the and the first stopper pin.

DETAILED DESCRIPTION OF THE PREFERRED EMBODIMENTS

Figure 1:
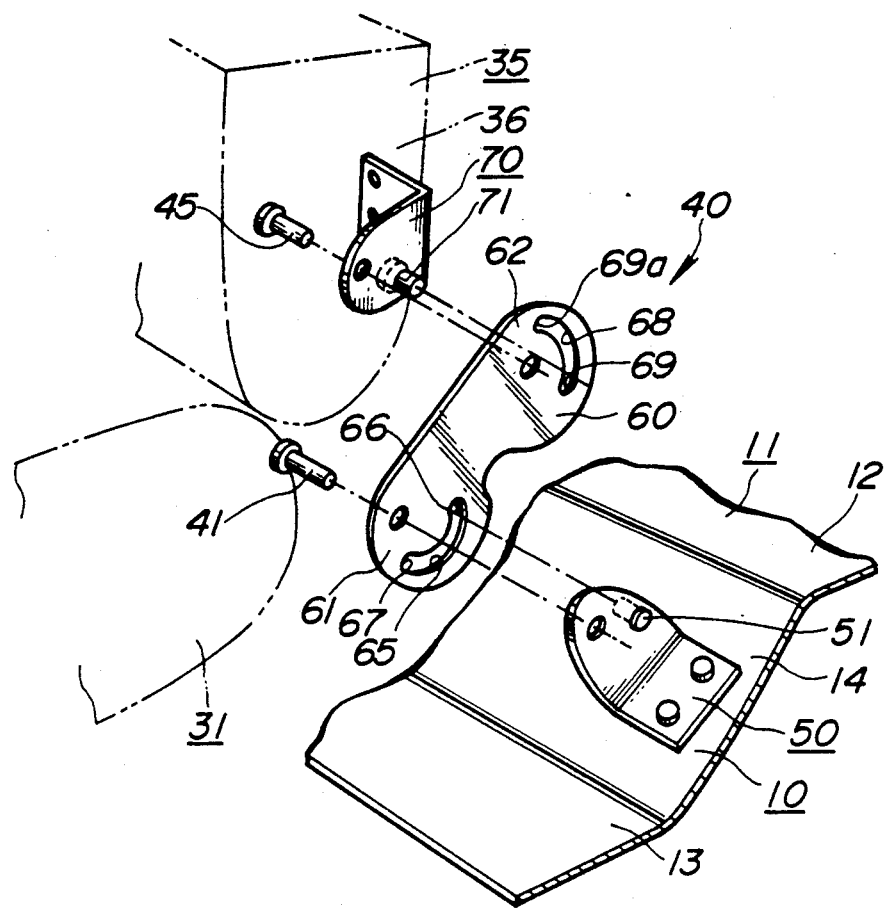
FIG. 1 is an exploded perspective view in which the essential parts of a seat back hinge mechanism of an exemplary embodiment of the present invention are explanatarily depicted.

For a better understanding of the invention, the operating details of the vehicular seat according to the invention shall be given first.

When the vehicular seat according to the invention is in its regular or riding state the seat cushion 31 occupies a cushion receiving surface 13 defined in an indentation of the vehicular floor, and the seat back 35 occupies the standing position. Under these conditions, the connector link 60 is in its vertical position and the stopper pin 51, which is received in a slot 65 formed in the link 60, is in engagement with an end 66 of the link arcuate slot 65. By means of this engagement, rearward pivotal movement of the seat back 35 is prevented. The stopper pin 71, which is integrally formed on a seat back bracket 70 on the other hand, rests within the arcuate slot 68, formed in the seat hinge connector link 60, so as to engage one end 69 thereof.

When the seat back 35 is pivotally moved forwardly from the above standing position, the stopper pin 71 moves relatively within the arcuate slot 68 so as to engage the other end 69a of the slot 68. In this way the seat back 35 is moved into its "stacked" position wherein it is arranged so as to lay over the cushion 31.

During the above described movement of the seat back 35, the connector link 60 remains in the vertical or standing position.

If the seat cushion 31 has been moved from the cushion receiving position to the "escaped" position, in order to put the seat back 35 into the cushion receiving position 13 defined on the floor of the vehicle, which normally holds the seat cushion 31, the seat back 35 is tilted forward, just as in the above described pivotal operation. As before, the stopper pin 71 moves relatively within the slot 68 from a first end position 69 to a second end position 69a, while in this way the seat back 35 moves from the standing position to the stacked position.

Therefore, further downward pivotal movement of the top of the seat back 35 relative to the connector link 60 is restricted by the engagement between the stopper pin 71 and the portion of slot 68 defining the second end position 69a, the movement of the stopper pin 51 within the arcuate groove 65 on the other hand is not restricted. Therefore, the stopper pin 51 moves relatively within the slot 65 from the first end 66 thereof to the second end thereof. In this manner, the connector link 60 is pivoted from the standing position to the forward position, and the seat back 35 moves therewith from the stacked position to the "sunken" position wherein it is received in the recessed cushion receiving position 13 defined on the floor of the vehicle.

In order to switch the seat back 35 from the "sunken" position to the standing position, the seat back 35 is first lifted toward the stacked position when a seat back lifting force is exerted on the connector link 60 which urges it toward its standing position.

Since the stopper pin 51 does not restrict the connector link 60 from moving in the rearward direction when the seat back 35 is in the "sunken" position, the connector link 60 is allowed to pivot as the stopper pin 51 moves relatively within the link stopper groove 65 from the second end 67 thereof to the first end 66 thereof. In this manner, the connector link 60 is pivoted from the forward position to the standing position. Thereafter, further backward movement of the connector link 60 is prevented by the engagement between the stopper pin 51 and the first engaging surface 66 of the slot 65.

The second stopper pin 71 on the other hand, is unrestricted within the slot 68 and moves relatively within the slot 68. In this manner the seat back 35 is caused to move from the "sunken" position thereof to the stacked position, and it is therefore moved to the standing position in a simple operation.

Referring now to FIGS. 1 through 6, the details of the exemplary embodiment of the present invention whose operation has been set forth above will be more readily apparent.

Figure 2:
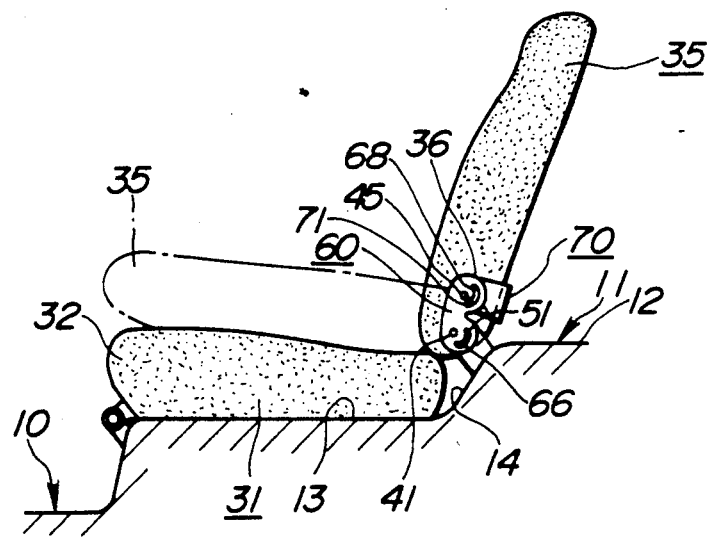
FIG. 2 is a side elevation view of a seat of an automotive vehicle which employs the seat back hinge mechanism depicted in FIG. 1 and which shows the stacked position of the seat back, in which it rests over the seat cushion, in phantom lines.
Figure 3:
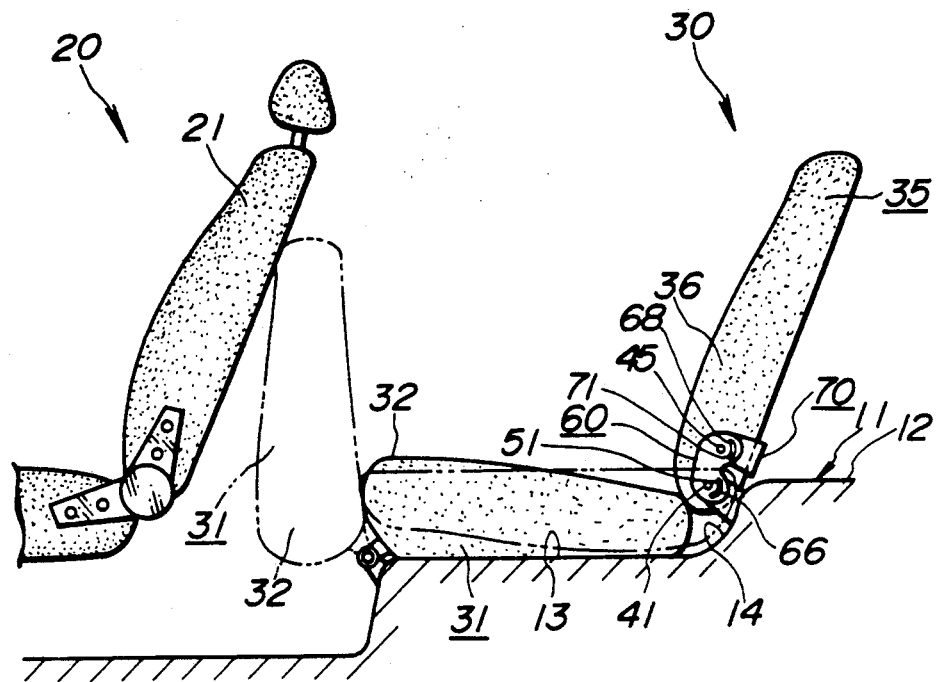
FIG. 3 shows a seat arrangement of a vehicle in which a seat having the seat back hinge mechanism depicted in FIGS. 1 and 2 and formed in accordance with the present invention, is depicted in a side elevation view with the escaped position of the seat cushion and the "sunken" position of the seat back indicated in phantom chain lines.

Referring now to FIGS. 1 through 3 with particular attention to FIG. 3, a front seat 20 and a rear seat 30 mounted on the floor of an automotive vehicle are depicted. The recessed seat cushion receiving surface 13, in which the seat cushion 31 of the rear seat 30 is accommodated, is lower than the rear floor section 11 of the general surface of the floor member 12, preferably by a distance equal to the thickness of the seat cushion 31 or of the seat back 35. Thus it will be appreciated that when the seat back 35 is in the "sunken" position the rear surface of the seat back 35 and the general surface of the floor are equal in height and thus cooperate to define a rather expansive level surface appropriate for receiving luggage or accommodating horizontal human activity, such as sleeping among other things.

As shown in FIG. 3, in order to allow the seat cushion 31 to pivot between a position in which it is received in the seat cushion receiving recess 13 as indicated by the solid lines and an "escaped" position in which it is arranged so as to stand vertically resting against the back surface of the front seat 21, the seat cushion 31 is pivotably supported at its front edge 32 by a hinge.

By means of the seat back hinge assembly 40, the seat back 35 is connected to the inclined section 14 of the floor. The inclined section 14 of the floor defines a step down between the general surface 11 of the rear floor 12 and the seat cushion receiving surface 13.

The seat hinge assembly 40 is connected to the inclined section 14 by means of a rigidly fixed body bracket 50. By means of a pivot pin 41, the connector link 60 is journalled to the body mount bracket 50, at the base end 61 thereof, so as to allow pivotal movement of the seat back 35 between a substantially vertical position and a state in which it is pivoted forward to lie horizontally.

By means of the pivot pin 45, the connector link 60 is pivotably connected at its upper end 62 to the lower end 36 of the seat back 35, by means of a seat back bracket 70.

The body bracket 50 has rigidly formed thereon the first stopper pin 51. The arcuate slot 65 formed, with the pivot pin 41 defining the center of its arc, at the lower end 61 of the connector link 60, receives the link stopper pin 51. In this way the slot 65, in cooperation with the link stopper pin 51, serves to define the range of relative pivotal movement of the connector link 60 relative to the vehicular body.

A first end 66 of slot 65 defines a stop against which the stopper pin 51 impinges for defining the rearward limit in the range of pivotal movement of the connector 60 at a position slightly beyond the vertical position. The second end 67 of the slot 65, similarly to the first end 66, defines a stop against which the stopper pin 51 impinges for defining the limit of the range of pivotal movement of the connector link 60 in the forward direction such that the connector link 60 may not pivot beyond a substantially horizontal position.

The seat back bracket 70 has rigidly formed thereon the second stopper pin 71. The second arcuate slot 68 which is formed with the axis of the journal pin 45 defining the center of its arc is defined at the upper side 62 of the connector 60. The slot 68 receives the stopper pin 71 so as to define the range of pivotal movement of the seat back 35 relative to connector link 60.

The first engaging end surface 69 of the slot 68 at the upper side of the connector link 60 engagingly receives the seat back stopper pin 71 so as to define the rearward limit in the range of pivotal movement of the seat back 35. Thus rearward pivotal movement of the seat back 35 is arrested at the predetermined point which is slightly beyond the vertical position as indicated in solid lines in FIG. 3.

Similarly to the operation disclosed above with regard to the slot 68, the second end 69a of the slot 68 at the upper side of the connector link 60 serves, in cooperation with the seat back stopper pin 71, when the connector link 60 is maintained in the vertical position and the seat back 35 is laying forward in the stacked position as shown by the dotted lines in FIG. 2, to provide resistance to the movement of the seat back 35 beyond the substantially horizontal stacked position. This resistance to the further downward movement of the seat back 35 occurs when the groove end 69a receives stopper pin 71.

Figure 4:
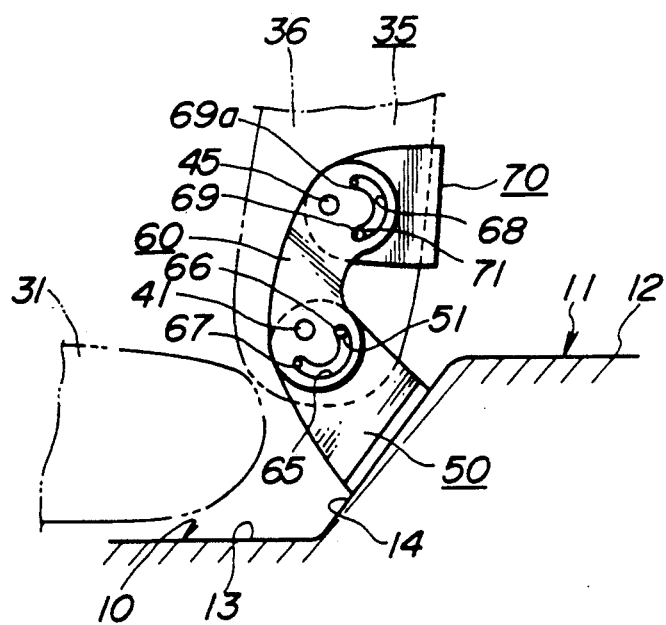
FIG. 4 is an expanded partial side elevation view showing the seat hinge according to the invention in a state wherein the seat back of the vehicular seat according to the invention is standing upright in its riding position and the seat back and the seat cushion are indicated in phantom chain lines.

Directing attention now to FIG. 2 and FIG. 4, it will be noted that the seat cushion 31 is in the received or riding position, and the seat back 35 is in the standing position. It will further be noted that the connector link 60 is in its standing position and that the stopper pin 51 is in engagement with the first end 66 of the slot 65. In this manner, further pivoting of the connector link 60 in the rearward direction is prevented. The stopper pin 71 is receivingly engaged with the first end 69 of the slot 68 for preventing the seat back 35 from pivoting further backward.

Making reference now to FIG. 1 and FIG. 2 when the seat back 35 is pivoted forward, the slot back bracket 70 pivots forward about the axis defined by pivot pin 45, seat back stopper pin 71 moves from the first end 69 of the slot 68 to the second end 69a of the slot 68.

Figure 5:
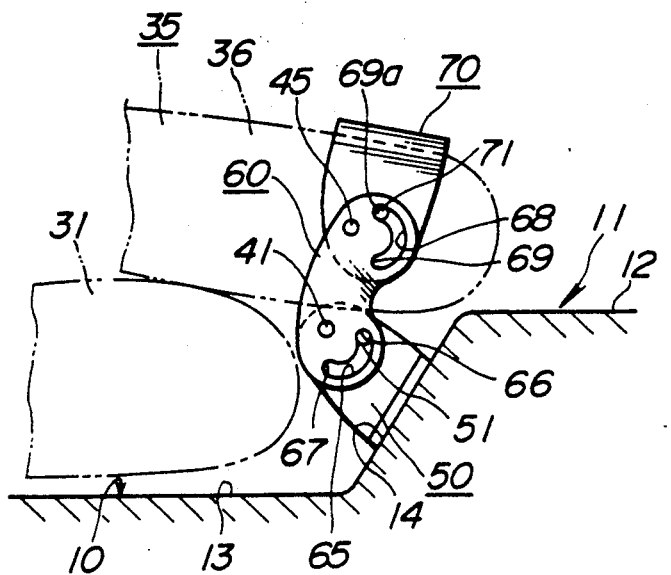
FIG. 5 is an expanded partial side elevation view showing the seat hinge according to the invention in a state wherein the seat back of the vehicular seat according to the invention is laying over the seat cushion so as to rest in its stacked position and the seat back and the seat cushion are indicated in phantom chain lines.

During this movement, as will be appreciated from the above, no lock release operation is necessary for the seat back 35 to be pivoted forward so as to lay over the seat cushion 31 in the manner shown in FIG. 2 and in FIG. 5 by the chain lines defining the stacked position of the seat back 35. During the this operation, the connector link 60 remains in the vertical position.

As can be appreciated from FIG. 3, the seat cushion 31 which is indicated in solid lines, in the riding position, may be pivoted about a pivoting axis defined by the cushion hinge mechanism located at its front edge 32 so as to enter a substantially vertical position in which it is caused to lean against the rear surface of the front seat 21 as indicated by the chain lines in the figure. In this manner, the cushion receiving recess surface 13 of the vehicular floor, which had been previously occupied by the seat cushion 31, becomes exposed.

Next, when the seat back 35, shown in its standing position by the solid lines, is tilted forward, as set out previously above, stopper pin 71 moves relatively within the slot 68 from the first end 69 to the second engaging end 69a, and the seat back 35 is moved from the standing position to the stacked position.

Furthermore, as the seat back 35 is moved further forward from the stacked position, the stopper pin 71 engages the second end 69a of the slot 68 in the connector link 60 so as to restrict relative movement therebetween. As a result, as can be seen in FIG. 5 the connector link 60 shown in its standing position pivots, about the axis defined by the pivot pin 41, in the counter clockwise direction defined with respect to the figure.

Figure 6:
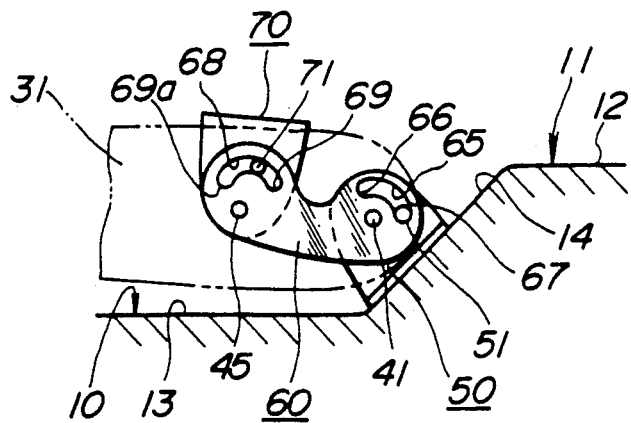
FIG. 6 is an expanded partial side elevation view showing the seat hinge according to the invention in a state wherein the seat back of the vehicular seat according to the invention is laying in the position on the vehicular floor normally occupied by the seat cushion, so as to be in its "sunken" position, the seat back being indicated in phantom chain lines.

In substantially the above disclosed manner, the stopper pin 51 moves relatively within the slot 65 from the first end 66 toward the second end 67, so as to come into engagement with the second end 67. In this operation the connector link 60 moves pivotally from the standing position to the forward tilted horizontal position in which it is shown in FIG. 6. The connector link 60 is thereafter restricted from further forward pivotal movement.

As a result of the operation set forth above, the seat back 35 pivots in the forward direction about the pivot pin 41 from the stacked position indicated in chain lines in FIG. 5 to the "sunken" position indicated in chain lines in FIG. 6.

This means that seat back 35, without any necessity for unlocking operations to be carried out, may be repositioned from the standing position to the "sunken" position, and further, without the necessity of performing any locking operations it may be restricted to the "sunken" position.

In order to alter the position of the seat back 35 from the "sunken" position shown in FIG. 6 to the standing position, without the necessity of carrying out any lock releasing operations, the seat back 35 is simply lifted, and the stopper pin 51 moves relatively within the 65 from the second end 67 in the direction of the first end 66 to so as come into engagement with the first end 66. The connector link 60 moves pivotally about the axis defined by the pivot pin 41 from the forward tilted horizontal position to the standing position and is restricted by means of the stopper pin 51 from further pivotal movement in the rearward direction. At this point the seat back 35 is in the stacked position.

Further, when the seat back 35 is to be further pivotally raised so as to continue to the standing position, the stopper pin 71 is caused to move relatively within the slot 68 from the second end 69a to the first end 69. As a result of the above operation, the seat back bracket 70 is caused to pivot.

It will be appreciated that the net result of the above operation is that, without the necessity of carrying out any locking operations, and further without the necessity of carrying out any lock releasing operations, it is possible according to the above disclosed sequence of operations to move the seat back 35 from the "sunken" position to the horizontal stacked position and thereafter to raise the seat back 35 from the horizontal stacked position to the standing position in which standing position it may be maintained.

It will be appreciated, that although in the embodiment set forth in the above dissertation, the stopper pin 51 is formed integrally upon the side of the seat hinge body bracket 50, and the slot 65 is formed integrally in the seat back connector link 60, it would be readily apparent to those skilled in the art, that in an alternative embodiment to that set out above, the stopper pin 51 may be formed integrally on the side of the connector link 60 and accordingly, the slot 65 may be formed in the body bracket 50 of the hinge assembly.

Similarly the stopper pin 71 may be formed in the connector link 60, and accordingly the slot 68 may be formed at the seat back bracket 70 side.

Thus, by the provision of a seat back hinge assembly according to the present invention, a seat suitable for installation in an automotive vehicle is provided. Thanks to the novel configuration of the hinge mechanism, through the engaging relationship between a hinge connector link stopper pin and an arcuate slot and the engaging relationship between a stopper pin and a seat back stopper slot, it is possible to provide a mechanism by which predetermined positions of the seat may be established and maintained. This seat hinge mechanism further has the advantageous characteristics of being inexpensive to produce and of being simple in construction. Further, it can be seen that, without the necessity for performing any troublesome locking operations or lock mechanism releasing operations, it is possible to easily pivotally move the seat back to any of the predetermined positions in which the user desires it to be located.

What is claimed is:

1. In a seat assembly for a vehicle, said seat assembly including a seat cushion which is movable between a riding position in which said seat cushion rests in a predetermined receiving space defined by a vehicular floor and an escaped position in which said seat cushion is removed from said receiving space, leaving said receiving space vacant, and a seat back which is movable between a standing position in which said seat back stands, a stacked position in which said seat back lays on a top surface of said seat cushion when said seat cushion assumes said riding position, and a sunken position in which said seat back occupies said receiving space when said receiving space is evacuated by said seat cushion, and a hinge mechanism comprising:
 a body bracket secured to secured vehicular floor;
 a seat back bracket secured to said seat back;
 a connector link having a base end portion pivotally connected through a first pivot pin to said body bracket and an upper end portion pivotally connected through a second pivot pin to said seat back bracket, a first arcuate slot located in one of said base end portion of said connector link and said body bracket concentric with said first pivot pin, and a second arcuate slot in one of said upper end portion of said connector link and said seat back bracket concentric with said second pivot pin;
 a first stopper pin secured to the other of said base end portion and said body bracket, and slidably engageable with said first arcuate slot; and
 a second stopper pin secured to the other of said upper end portion and seat back bracket, and slidably engageable with said second arcuate slot;
 wherein said first and second stopper pins allow said connector link to pivot freely about said first and second pivot pins, respectively.

2. A hinge mechanism as set forth in claim 1, wherein said first and second arcuate slots are so shaped that when said seat back assumes said standing position, said first stopper pin abuts against one end of said first arcuate slot and said second stopper pin abuts against one end of said second arcuate slot, when said seat back assumes said stacked position, said first stopper pin abuts against said one end of said first arcuate slot and said second stopper pin abuts against the other end of said second arcuate slot, and when said seat back assumes said sunken position, said first stopper pin abuts against the other end of said first arcuate slot and said second stopper pin assumes as position apart from both ends of said second arcuate slot.

3. A hinge mechanism as set forth in claim 2, wherein said first arcuate slot is formed in said connector link, and said first stopper pin is secured to said body bracket.

4. A hinge mechanism as set forth in claim 2, wherein said second arcuate slot is formed in said connector link, and said second stopper pin is secured to said seat back bracket.

5. A hinge mechanism as set forth in claim 1, wherein said second arcuate slot is formed in said connector link, and said second stopper pin is secured to said seat back bracket.

6. A hinge mechanism as set forth in claim 1, wherein said first arcuate slot is formed in said connector link, and said first pivot pin is secured to said body bracket.

7. In a seat assembly for a vehicle, said seat assembly including a seat cushion which is movable between a riding position in which said seat cushion rests in a predetermined receiving space defined by a vehicular floor and an escaped position in which said seat cushion is removed from said receiving space, leaving said receiving space vacant, and a seat back which is movable between a standing position in which said seat back stands, a stacked position in which said seat back lays on a top surface of said seat cushion when said seat cushion assumes said riding position, and a sunken position in which said seat back occupies said receiving space when said receiving space is evacuated by said seat cushion, and a hinge mechanism comprising:

a body bracket secured to secure vehicular floor;

a seat back bracket secured to said seat back;

a connector link having a base end portion pivotally connected through a first pivot pin to said body bracket and an upper end portion pivotally connected through a second pivot pin to said seat back bracket, a first arcuate slot located in one of said base end portion of said connector link and said body bracket concentric with said first pivot pin, and a second arcuate slot in one of said upper end portion of said connector link and said seat back bracket concentric with said second pivot pin;

a first stopper pin secured to the other of said base end portion and said body bracket, and slidably engageable with said first arcuate slot; and a second stopper pin secured to the other of said upper end portion and seat back bracket, and slidably and freely engageable with said second arcuate slot;

wherein said first and second arcuate slots are so shaped that when said seat back assumes said standing position, said first stopper pin abuts against one end of said first arcuate slot and said second stopper pin abuts against one end of said second arcuate slot, when said seat back assumes said stacked position, said first stopper pin abuts against said one end of said first arcuate slot and said seconds stopper pin abuts against the other end of said second arcuate slot, and when said seat back assumes said sunken position, said first stopper pin abuts against the other end of said first arcuate slot and said second stopper pin assumes a position apart from both ends of said second arcuate slot.

* * * * *